Oct. 10, 1961

F. A. KROHM 3,003,175

DETACHABLY CONNECTING A WINDSHIELD WIPER
BLADE UNIT AND A PRESSURE UNIT

Filed Sept. 15, 1958

INVENTOR.
FRED A. KROHM
BY Charles A. Penfold
Aubrey D. McFadyen &
William E. Beckenwald
ATTORNEYS

United States Patent Office 3,003,175
Patented Oct. 10, 1961

3,003,175
DETACHABLY CONNECTING A WINDSHIELD
WIPER BLADE UNIT AND A PRESSURE UNIT
Fred A. Krohm, Hobart, Ind., assignor to The Anderson
Company, a corporation of Indiana
Filed Sept. 15, 1958, Ser. No. 761,240
14 Claims. (Cl. 15—250.42)

This invention relates generally to windshield wipers and more particularly to a wiper which will wipe a windshield having curved or flat surfaces or combinations of these surfaces.

The wiper may be constructed in various ways, but as herein shown comprises a blade unit and a pressure-distributing unit operatively connected to the blade unit. The blade unit or assembly includes a resilient wiping element and a resiliently flexible support detachably connected to the element and the pressure unit or assembly preferably includes a pair of secondary yoke members having their ends connected to the blade at longitudinally spaced points, a bridge member having it sends connected to the secondary yokes, and a connector carried by the bridge for attachment with a wiper arm for applying pressure to the wiper.

The primary object of the invention is to provide improved connection means for detachably connecting at least one end of the bridge with one of the secondary yokes. More particularly in this respect, the connection means preferably includes a secondary yoke provided with means for receiving an entering part or projection on the bridge, a pair of elongated resiliently flexible members secured to the yoke which cooperate with the entering part in a manner to jointly hold the part in the receiving means, and a manual control for operating at least one of the flexible members for effecting a release of the part to permit separation of the yoke and bridge.

A significant object of the invention is to provide a connection in which at least one of the flexible members serves to yieldably hold the projection on the bridge in the receiving means on the secondary yoke in order to prevent rattling or vibration between the bridge and yoke while permitting relative pivotal movement therebetween when the wiper is operated.

A specific object of the invention is to secure the yieldable means within the confines of a secondary yoke so that it is substantially concealed from view when the yoke is attached to the bridge.

Another object of the invention is to provide a connection of the kind described above in which one of the elongated flexible members serves to hold the manual control in a predetermined position for operation when the bridge and yoke are connected and wherein both flexible members serve this purpose when the bridge and yoke are separated.

Additional attributes of the invention reside in providing a connection means comprised of a minimum number of components or parts which can be economically manufactured and assembled, and one which offers advantages with respect to stability, durability and efficiency.

Other objects and advantages of the invention will become apparent after the description hereinafter set forth is considered in conjunction with the drawings annexed hereto.

In the drawings wherein a preferred form or embodiment of the invention is exemplified:

Figure 1:
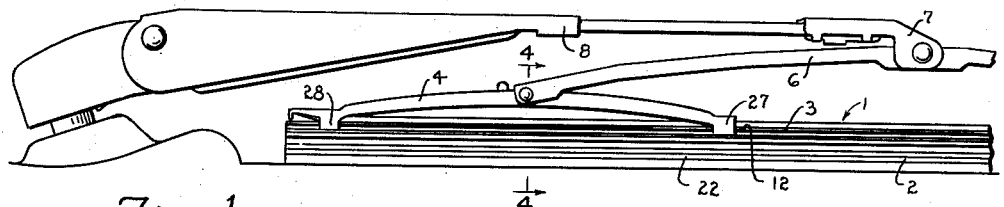
FIGURE 1 is a side elevational view of a part of a wiper embodying the invention and a wiper arm operatively attached to the wiper.
Figure 2:
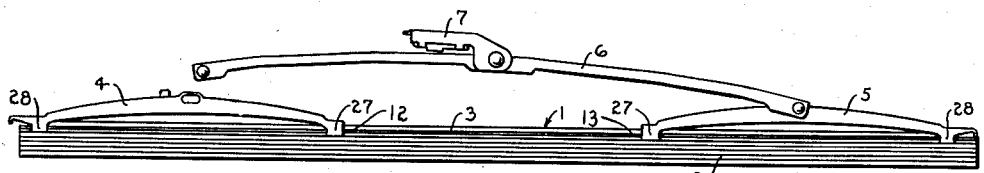
FIGURE 2 is a side elevational view of the wiper shown in FIGURE 1, with one end of the bridge detached from a secondary yoke.
Figure 8:
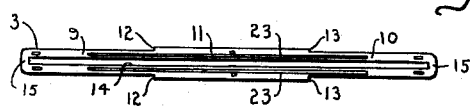
FIGURE 8 is a top view of the support constituting a component of the wiper blade unit.
Figure 3:
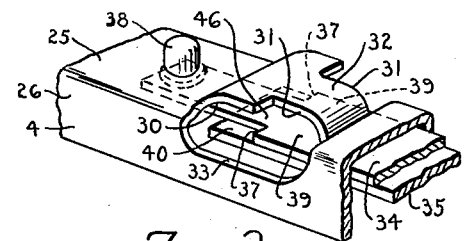
FIGURE 3 is an enlarged partial perspective view of that part of the connection means provided on a secondary yoke.
Figure 7:
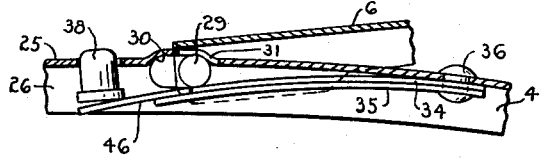
FIGURE 7 illustrates a way to effect release of the bridge and a secondary yoke or a step in assembling same.
Figure 5:
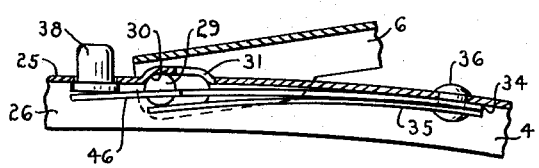
FIGURE 5 is an enlarged partial longitudinal section of the wiper showing how the bridge and a secondary yoke are operatively connected.
Figure 6:
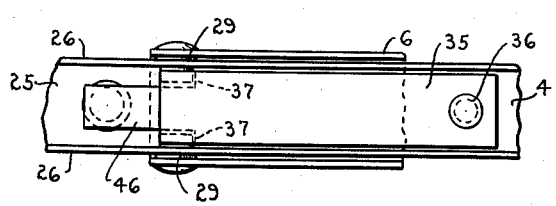
FIGURE 6 is a bottom view of the structure shown in FIGURE 5.

Referring primarily to FIGURES 1 and 2 of the drawing, numeral 1 generally designates a wiper blade unit comprising a resilient wiper element 2 carried by a support 3. The pressure unit may include a plurality of relatively movable components such as a pair of secondary yokes 4 and 5 having their ends attached to the blade unit, a bridge 6 having its ends attached to the yokes, and a connector 7 provided on the bridge for connection with a wiper arm 8 for urging and directing the wiper back and forth on a windshield or other surface to be cleaned.

The support 3 of the blade unit may be constructed as desired but is preferably elongated and provided with corresponding reduced end extremities 9 and 10 and an intermediate portion 11 of a greater width than the extremities. This variation in width forms longitudinally spaced stops or shoulders 12 and 13. The support is also preferably provided with an elongated narrow slot 14 terminating short of the ends to provide connecting or hinge portions 15 whereby longitudinal parallel side portions of the support can be spread apart to enlarge the size of the slot so that the resilient element 2 can properly be located therein, after which the longitudinal portions are released to cause such portions to interlock with the element.

Figure 4:
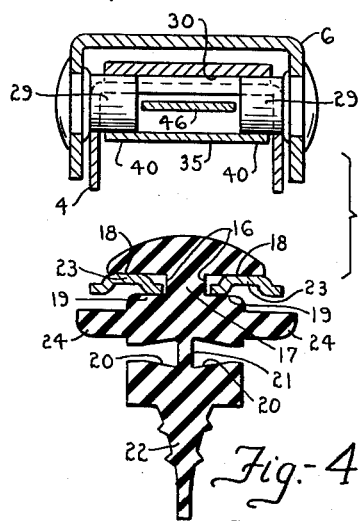
FIGURE 4 is a transverse section taken substantially on line 4—4 of FIGURE 1 depicting certain details of the structure.

The resilient element 2, as best depicted in FIGURE 4, is preferably formed in one piece with opposed longitudinally extending exterior grooves 16 therein to provide a neck 17. The grooves 16 receive the inner marginal edge portions of the longitudinal side portions of the support with the neck 17 between such portions and the upper portions 18 and lower portions 19 of the element defining part of the grooves more or less engaging the upper and lower surfaces of the support. The element is further formed with a second pair of opposed longitudinally extending exterior dovetail grooves 20 to provide a hinge 21 to permit oscillation of a wiping head 22 having wiping edges thereon. In other words, the element 2 includes an attaching portion provided with grooves which receive the support and a wiping head or portion which is hinged to the attaching portion for oscillation with respect thereto. It will be noted that the side portions of the support are provided with corresponding raised longitudinal extending corrugations or ribs 23, the outer extremities of which taper and terminate predetermined distances inwardly from the ends of the support so that the support is divided into an intermediate zone having a predetermined flexation and outer zones or areas of different predetermined flexation in order that the blade will readily conform to the surface to be wiped. The intermediate zone shown is somewhat less flexible than the outer zones. However, it is to be understood that the support may be formed otherwise than depicted so as to vary its flexibility at different locations throughout its length. As shown in FIGURE 4, the upper surfaces of the corrugations 23 bear against the upper portions 18 of the element.

It will be further noted that the wiper element is provided with a pair of longitudinally extending flexible flanges or lips 24 which project laterally and serve to prevent the support and the ends of the secondary yokes from engaging and scratching a glass on which the blade travels.

The secondary yokes as shown are substantially identical in design and construction. More particularly in this respect, each yoke is preferably made in the form of a channel to include a base wall 25 and side walls 26. The yokes 4 and 5 are respectively mounted on the reduced extremities 9 and 10 of the support and the inner end of each yoke is preferably formed to provide a transverse arcuate or curved portion which may engage or bear against the upper surface of the attaching portion of the wiper element and corresponding inturned ears 27 which may slidably embrace or engage the sides of the support and engage the abutment means or stops 12 and 13 on the support to limit or predetermine the extent of the relative longitudinal movement between the support and pressure unit when the latter is properly mounted for operation on the blade unit. The outer end of each of the yokes is preferably provided with a transverse portion which may bear or rest on the upper surface of the attaching portion of the element and inturned ears 28 which may slidably embrace or engage the sides of the support, in a manner substantially similar to that of the transverse portions and ears on the inner ends of the yokes. The outer end of each of the yokes is also preferably provided with a longitudinally extending continuation which is formed to overlie the element and depend adjacent an end of the attaching portion of the element.

The secondary yokes are preferably assembled with the support by merely sliding the yokes inwardly along the reduced extremities of the support until the inner ends of the yokes engage the stops or abutment means 12 and 13, after which the bridge is attached to one of the secondary yokes in a manner which will be described more in detail subsequently.

As pointed out above, one of the objects of the invention is to provide improved means for detachably connecting the bridge to at least one of the secondary yokes, but if desired the means may be used to detachably connect the bridge to both of the yokes. The means utilized for this purpose preferably includes providing one end of the bridge with a pair of inturned corresponding projections or entering parts 29, an intermediate portion of the secondary yoke 4 with a seat 30 and pair of generally oblong or elongated openings which receive the projections, and yieldable means for holding the projections on the seat. More specifically in this respect, the base wall 25 of the yoke 4 is constructed to provide a raised or elevated curved portion defining the seat 30. The marginal sides of the raised portion are notched or interrupted at 31 to define entrance openings through which the projections 29 on the bridge are inserted. The notches 31 are separated by a narrow or intermediate portion 32 of the raised portion. The side walls of the yoke are preferably provided with elongated notches 33, the inner extremities of which intersect the notches 31 and the outer extremities of which are located below the seat. The notches 31 and 33 form what may be termed L-shaped openings and each raised portion when viewed from the top is generally T-shaped. It will be noted that the marginal ends of the elongated notches 33 are arcuate or curved to substantially the same extent as the extremities of the raised portion. The seat 30 is what may be termed a receiving means, a socket formation, or an abutment means which is adapted to detachably receive the corresponding projections 29 on the bridge, or the seat in combination with the adjacent arcuate end marginal edges of the elongated slots 33 below the seat may also be defined by such terms.

The bridge may be designed and constructed in various ways, but as herein shown it is preferably made in the form of a channel and the end extremities of the side walls are preferably widened and carry the projections 29 above referred to. More specifically in this respect, each of the widespread side walls is provided with an aperture and each of the projections is preferably formed to include a reduced cylindrical portion which extends through the aperture so that its outer end may be upset to permanently secure the projection in place and so that an enlarged cylindrical portion of the projection is disposed within the confines of the bridge. The projections are axially spaced and this spacing and the size of the enlarged portions is predetermined so that the enlarged or inner portions may be introduced into the elongated notches 33 through the notches 31 and brought into a nested relationship with the seat or receiving means above referred to. Obviously, the projections or entering parts may be constructed in different ways. For example, they may be extruded inwardly from the side walls of the bridge.

Any one of various means may be employed to detachably detain or hold the projections in relation to the receiving means. The means herein disclosed for this purpose is preferably designed and constructed to include what may be termed yieldable or resiliently flexible means. More particularly in this regard, such means preferably comprises a pair of elongated leaf springs 34 and 35 secured together in a superimposed overlapping relation within the confines of each of the secondary yokes by means of a fastener such as a rivet 36 which extends through apertures provided therefor in the inner ends of the springs and through an aperture provided therefor in the base wall 25 of the yoke so as to permanently secure or anchor the inner ends of the springs in place in order to locate the outer or opposite extremities of the springs in a predetermined operative relationship with respect to the seat 30 and openings adjacent thereto in a manner which will now be described.

The lower spring 35 is of substantially uniform width and thickness and the inner extremity of the upper spring 34 is of a width corresponding to the width of the lower spring and also of the same thickness. Obviously, if desired, one spring can be made thicker than the other. The sides of the outer extremity of the upper spring are provided with clearance notches which define a tongue 46 and a pair of adjacent abutments 37. A portion of the tongue extends outwardly beyond the free outer end of the lower spring and bears against the underside of an enlarged portion of a manually operable control or button 38 having a smaller portion which projects outwardly through a clearance opening therefor in the base wall of the yoke for actuating either or both of the springs. The width of the tongue is preferably made slightly less than the width of the narrow portion 32 of the raised portion and the distance between the projections 29 on the bridge. The springs extend longitudinally substantially midway between the raised portion of the yoke and the longitudinally extending marginal edges of the elongated notches 33 so that side portions 39 of the upper spring are located below and accessible through the notches 31 and the abutments 37 are spaced predetermined distances from the seat or outer arcuate marginal end edges of the elongated slots. The arrangement is also preferably such that side portions of the lower spring provide lands 40 extending laterally outward from under the sides of the tongue adjacent the abutments 37. When a yoke is disconnected from the bridge, both springs serve to urge the control outwardly to a predetermined position for actuation.

With the foregoing organization it will be manifest that the bridge can be readily connected to the secondary yoke 4 by merely inserting the projections 29 on the bridge through the notches 31 in the raised portion and pressing down the side portions 39 of the upper spring, to retract the springs, and then sliding the projections on the side portions 39, in the elongated slots 33 and under the seat 30 and as they ride or pass over the abutments 37 on the upper spring into the clearance notches defining the tongue and onto the lands 40, the springs will automaticaly move upwardly so that the lower spring will press the projections or entering parts against the seat or receiving means and the abutments 37 will trap or block their release from the seat. Both springs offer resistance to entry of the projections so that when the projections ride onto the lands 40 of the lower spring the resistance is decreased and this may cause the lower spring to move a slight distance downwardly before it automatically moves upwardly. It is thus evident that the projections are resiliently confined to provide an efficient pivotal or journal connection between the bridge and secondary yoke and due to the influence of the lower spring the connection is rendered noiseless when the blade unit is wiping a surface. It will be noted that when the bridge and yoke are so connected that the springs are slightly spaced apart and act more or less independently of one another so that the upper spring serves the dual function of blocking release of the projections and maintaining the control button in an operative position while the lower spring urges the projections against the seat. The bridge can be readily released from the yoke by merely pressing the control sufficiently to move the springs away from the seat so that the abutments 37 are in an unblocking position, whereupon the projections can be moved inwardly in the elongated notches 33 and then out through the notches 31, which will enable one to detach the blade unit from the pressure unit and replace it with a new one when required. Assembly of the pressure unit and blade unit is preferably accomplished by first sliding the yoke 5 onto the reduced extremity 10 of the support and then the yoke 4 onto the reduced extremity 9 so that the bridge which is preferably permanently connected to the yoke 5 can be connected to the yoke 4 through the agency of the connection means above described. If desired the yoke 4 can be first slid onto the extremity 9 and then the yoke 5 onto the extremity 10 so that the free end of the bridge and yoke 4 can be connected. Obviously, since the reduced extremities of the support are identical the yokes can be slid onto the extremities desired. Also, as mentioned above the connection means may be employed to detachably connect both ends of the bridge to the yokes.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A first pressure member for use with a windshield wiper, said member being provided with receiving means, a pair of leaf springs carried by the member with one superimposed on the other, one of said springs serving to urge an entering part of a second pressure member against the receiving means, and the other spring serving to detachably hold the part in the receiving means while it is urged thereagainst.

2. The structure defined in claim 1 in which the first pressure member is provided with an opening and means extending into the opening for manipulation whereby the springs can be retracted to effect release of the part.

3. A pressure-distributing unit for attachment to a wiper blade unit, said pressure unit comprising a plurality of operatively connected members, one of said members having a channel portion provided with an offset seat and openings through which a pair of entering parts on another of the members may be inserted for disposition relative to the seat, a first elongate leaf spring secured within the confines of the channel portion and having a portion for urging the parts against the seat, and a second elongate spring secured to the channel portion and provided with abutment means for preventing release of said parts.

4. A first member for use with a windshield wiper, said member being provided with a pair of openings and a seat disposed between the openings, a second member having a pair of projections insertable through the openings disposed on the seat, and yieldable means carried by the first member and supporting the projections in a manner whereby to assist in detachably securing the projections on the seat to maintain the members assembled.

5. A first member for use with a windshield wiper, said member being provided with receiving means, a second member provided with an entering part disposed in the receiving means, a first elongate leaf spring secured to the first member and having a portion urging the part against the receiving means, and a second elongated leaf spring secured to the first member and bearing against the first spring for holding the part in the receiving means.

6. A pressure-distributing unit for attachment to a wiper blade unit, said pressure unit comprising a plurality of operatively connected members, one of said members having a seat and another of the members having an entering part for placement on the seat, a pair of elongate leaf springs carried by the one member for respectively urging and holding the part on the seat, and a manual control for depressing the springs to effect release of the part.

7. A first member for use with a windshield wiper, said member being provided with a pair of openings and a seat disposed between the openings, a second member having a pair of projections insertable through the openings disposed on the seat, and yieldable means carried by the first member having a portion for urging the projections against the seat and a portion having abutments for blocking the openings to prevent release of the projections from the seat.

8. An elongate yoke constituting a component of a pressure distributing unit for use with a windshield wiper blade unit, said yoke being provided with a seat and openings leading to the seat, a member having a pair of cylindrical projections insertable into the openings disposed on the seat, and a spring supporting and urging said projections against the seat.

9. A support for use with a windshield wiper, said support having a base wall provided with a raised portion defining an internal seat, said support also having side walls, said raised portion and said side walls being provided with notches defining openings leading to the seat so that a pair of entering parts may be inserted into the openings for disposition on the seat, and a spring for supporting and urging the entering parts against the seat.

10. A pressure-distributing unit for use with a windshield wiper unit comprising a first member having an upper portion formed to provide a raised concave seat and a pair of openings leading to the seat, a second member having a pair of inturned cylindrical projections insertable through the openings and journalled on the seat, and means for resiliently holding the projections on said seat.

11. The structure defined in claim 10, in which the holding means includes a pair of leaf springs which respectively serve to hold and urge the projections against the seat.

12. A pressure-distributing unit for use with a windshield wiper unit comprising a pair of members, one of said members being provided with an entering part and the other of said members being provided with a seat, a pair of superimposed resiliently flexible means for resiliently holding the part on the seat, and a manual control for actuating the resiliently flexible means for releasing the part from the seat, said control being normally held in a predetermined position by said resiliently flexible means when the part is removed from the seat.

13. A pressure structure for use with a windshield wiper blade, said structure comprising a first elongate member provided intermediate its ends with seat means and a pair of openings leading to the seat means, a second elongate member having an extremity provided with a pair of opposed projections insertable into the openings for disposition relative to the seat means to afford a pivotal movement between the members, and elongate resiliently flexible means secured to the first member and having an upper free extremity provided with abutments normally blocking release of the projections from the seat means, and a lower free extremity pressing the projections against the seat means.

14. The structure defined in claim 13 in which the first member is provided with an aperture, and a manual control is supported in the aperture by the upper free extremity of the resiliently flexible means in a manner whereby the control can be depressed to retract both free extremities so that the projections can be released from the seat means.

References Cited in the file of this patent

UNITED STATES PATENTS

| | | |
|---|---|---|
| 2,291,674 | Alden | Aug. 4, 1942 |
| 2,667,656 | Oishei | Feb. 2, 1954 |
| 2,807,821 | Scinta | Oct. 1, 1957 |

FOREIGN PATENTS

| | | |
|---|---|---|
| 201,976 | Australia | May 30, 1956 |
| 785,814 | France | May 27, 1935 |

UNITED STATES PATENT OFFICE

CERTIFICATE OF CORRECTION

Patent No. 3,003,175            October 10, 1961

Fred A. Krohm

It is hereby certified that error appears in the above numbered patent requiring correction and that the said Letters Patent should read as corrected below.

Column 1, line 21, for "it sends" read -- its ends --; column 2, line 59, for "longitudinal" read -- longitudinally --; column 4, line 5, for "widespread" read -- widened --; line 75, for "springs, and" read -- springs and --; column 6, line 18, for "elongated" read -- elongate --; line 41, for "pressure distributing" read -- pressure-distributing --.

Signed and sealed this 17th day of April 1962.

(SEAL)

Attest:

ESTON G. JOHNSON            DAVID L. LADD

Attesting Officer            Commissioner of Patents